May 29, 1956  G. S. JONES  2,747,462
DEVICE FOR SUPPORTING AN OBJECTIVE AND FILM DRIVE ROLL
Filed May 29, 1952  3 Sheets-Sheet 1

George S. Jones
INVENTOR.

BY

ATTY. & AGT.

May 29, 1956  G. S. JONES  2,747,462
DEVICE FOR SUPPORTING AN OBJECTIVE AND FILM DRIVE ROLL
Filed May 29, 1952  3 Sheets-Sheet 2
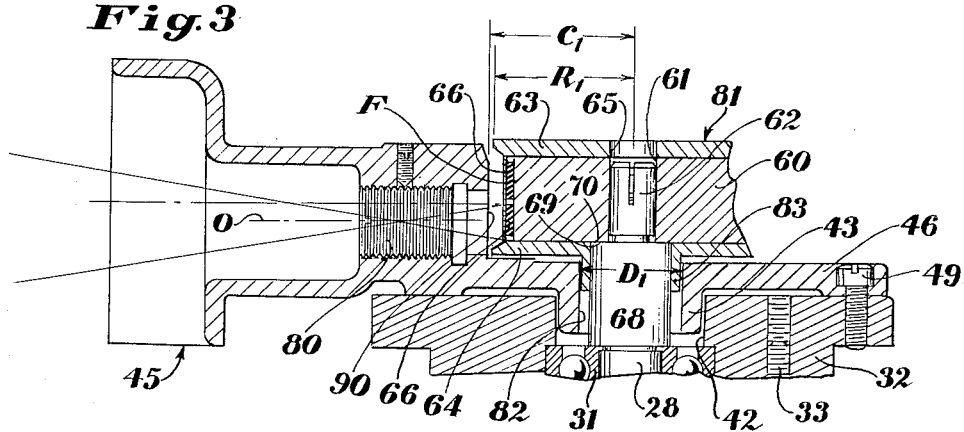
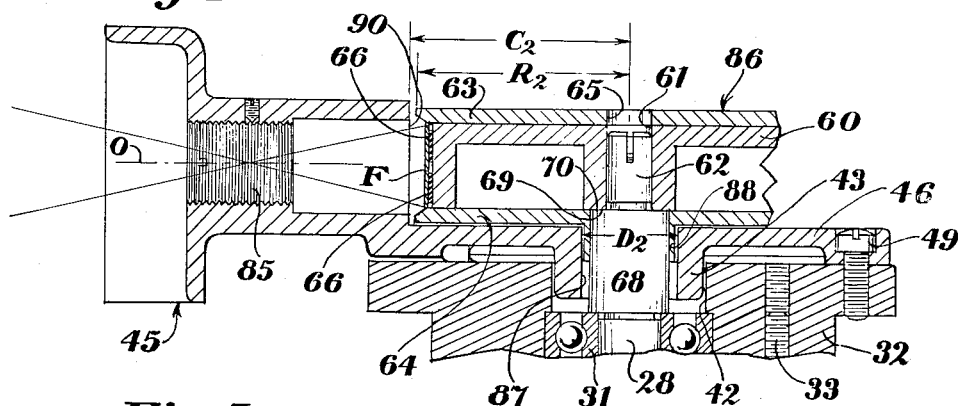
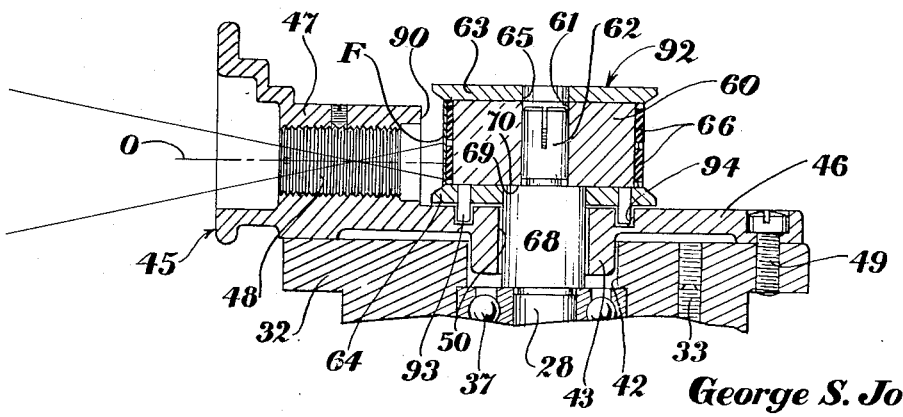
George S. Jones
INVENTOR.

May 29, 1956  G. S. JONES  2,747,462
DEVICE FOR SUPPORTING AN OBJECTIVE AND FILM DRIVE ROLL
Filed May 29, 1952  3 Sheets-Sheet 3
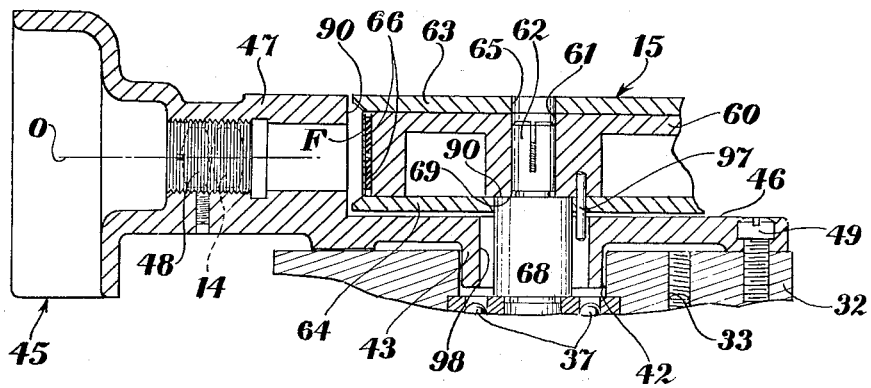
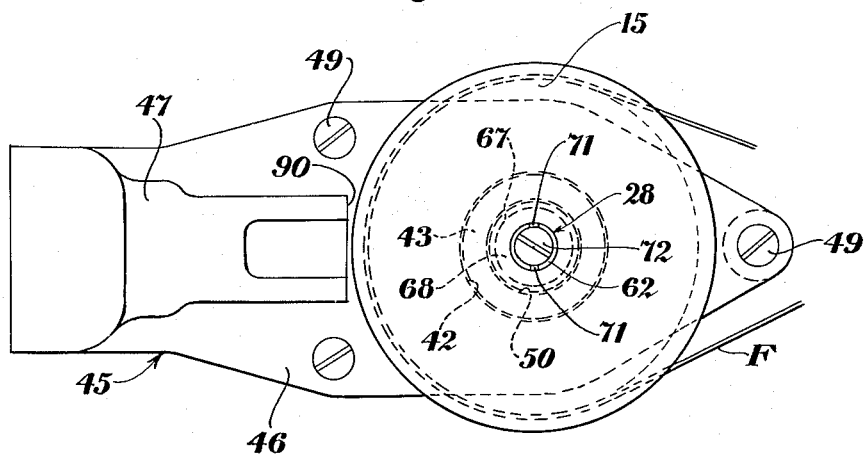
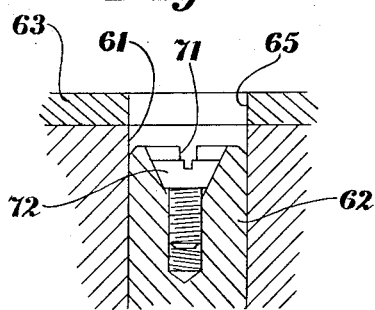
George S. Jones
INVENTOR.

United States Patent Office 2,747,462
Patented May 29, 1956

2,747,462

DEVICE FOR SUPPORTING AN OBJECTIVE AND FILM DRIVE ROLL

George S. Jones, Rochester, N. Y., assignor to Eastman Kodak Company, Rochester, N. Y., a corporation of New Jersey Application May 29, 1952, Serial No. 290,721

6 Claims. (Cl. 88—24)

This invention relates to photographic apparatus and more particularly to a support or mount for an objective used in conjunction with a film drive roll which moves the film strip through the focal plane of the objective at a predetermined speed dependent on the focal length of the objective.

In photographic copying apparatus, it is well-known to provide separate film units for each reduction factor to be used in making the copy. Each film unit, therefore, is provided with a supply reel, a take-up reel, a film drive roll and usually tension rolls arranged between the supply reel and film drive roll and between the film drive roll and take-up reel to provide a film path. Since the film strip must be moved in synchronism with the document and at a speed in relation to the reduction factor, each film unit is provided with an objective and a film drive roll which moves the film strip through the focal plane of the objective at such speed. In this way, the film is always positioned in the focal plane of the objective and is moved at the proper speed by the film drive roll.

Photographic copying apparatus in which only the film reels are removable necessitates that the objective and film drive roll be removable, if it is desired to change the reduction factor. Such an arrangement lends itself to confusion, particularly where the objective and film drive roll are "matched," that is, with each objective a particular diameter of film drive roll must be used. In order to prevent the operator from interchanging the objectives and film drive rolls, each "matched" set of objective and film drive roll is provided with a bracket devised for accepting only one lens and only one film drive roll. The bracket or objective mount comprises a mounting plate having an aperture which encircles the drive shaft and a housing for receiving and supporting the objective along an optical axis perpendicular to the axis of the drive shaft. The objective housing has a portion thereof which is perpendicular to the optical axis and arranged at a distance only slightly greater than the outside radius of the film drive roll from the axis of the film drive roll. The film drive roll is provided with a hub adapted to be received by the aperture in said mounting plate to permit the film drive roll to be operatively connected to the drive shaft. The relation between the film drive roll, objective, bracket and drive shaft is such that only the objective accepted by the mount and the film drive roll which moves the film strip through the focal plane of the objective can be accepted by the objective mount and operatively connected to the drive shaft. In this manner, any bracket will accept only one objective, a portion of the objective housing preventing a film drive roll placing the film strip between the objective accepted and its focal plane from being operatively connected to the drive shaft and the aperture in the mounting plate preventing a film drive roll having a hub larger than said aperture from being operatively connected to the drive shaft. Since the diameter of the hub of each film drive roll decreases as the diameter of the film drive roll increases, it can be readily appreciated that either the portion of the housing or the aperture in the plate will reject any film drive roll other than the specific film drive roll which is matched for the particular objective in the housing. As a result, it is impossible for the operator to assemble any combination but the right combination of bracket, objective and film drive roll.

The primary object of the invention, therefore, is to provide in a photographic copying apparatus a plurality of objectives and film drive rolls which are matched for different reduction factors and a bracket for each combination which will receive only one combination of objective and film drive roll.

Another object of the invention is to provide in a photographic copying apparatus a plurality of brackets, each bracket being adapted to receive only one objective and which permits only the film drive roll placing the film strip in the focal plane of the objective to be positioned on the drive shaft.

And another object of the invention is to provide in a photographic copying apparatus a bracket for supporting an objective along an optical axis and provided with an aperture of predetermined size for receiving the hub of a film drive roll which moves the film strip through the focal plane of said objective, a portion of said bracket preventing a film drive roll placing the film strip between said objective and said focal plane from being operatively connected to the drive shaft and said aperture preventing a film drive roll having a hub larger in diameter than said predetermined diameter of said aperture and placing the film strip beyond the focal plane of said objective from being operatively connected to the drive shaft.

These and other objects and advantages of the invention will be apparent to those skilled in the art by the description which follows.

Reference is now made to the accompanying drawings wherein like reference numerals designate like parts and wherein:

Fig. 3 is a partial vertical section in which a bracket supports a shorter focal length objective and a film drive roll of smaller diameter than that shown in Fig. 2 but having a larger diameter hub;

Fig. 4 is a partial vertical section in which the film drive roll is of larger diameter than that shown in Fig. 2 but having a smaller diameter hub;

Fig. 5 is a partial section similar to Figs. 2–4 showing another embodiment of the invention in which a pin carried by the film drive roll engages a matched annular recess in the bracket for permitting the film drive roll to be operatively connected to the drive shaft;

Fig. 6 is a partial vertical section similar to Figs. 2–4 showing another embodiment of the invention in which a pin extending from the film drive roll enters the aperture in the bracket to permit the film drive roll to be operatively connected to the drive shaft;

Fig. 7 is a plan view showing the relation between the film drive roll and the portion of the bracket which prevents placing a larger film drive roll on the drive shaft, and Fig. 8 is a detail view of the arrangement for clamping the film drive roll to the drive shaft.

Figure 1:
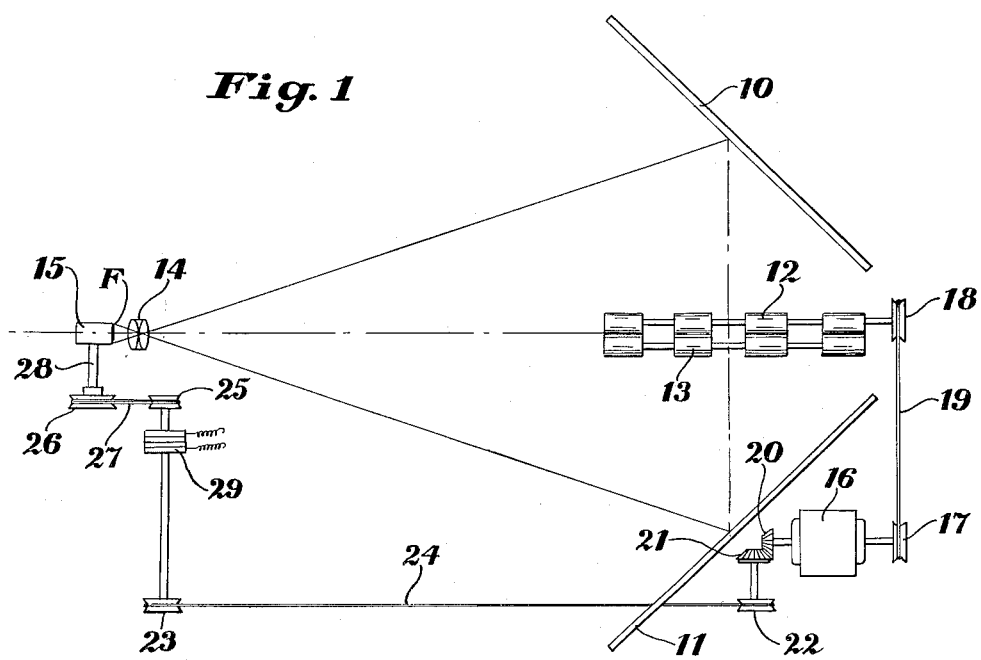
Fig. 1 is a diagrammatic view of a photographic copying apparatus embodying the invention.

The diagrammatic representation of a photographic copying apparatus, as disclosed in Fig. 1, shows a pair of mirrors 10 and 11 which are angularly disposed with respect to a photographing station through which a document is moved by rolls 12 and 13. The reflected images of both sides of the document are directed by mirrors 10 and 11 into objective 14 which projects the images in accordance with a reduction factor onto film strip F. As is well-known in the art, the film strip is usually of 16 mm. width and is moved from a supply reel to a take-up reel by the film drive roll 15 and is moved thereby through the focal plane of objective 14 in synchronism with the movement of the document. The drive means for moving the document and advancing the film strip comprises motor 16 which by means of pulleys 17 and 18 encircled by belt 19 drives rolls 12 and which through gears 20 and 21, pulleys 22 and 23 encircled by belt 24 and pulleys 25 and 26 encircled by belt 27 drives shaft 28 to which film drive roll 15 is operatively connected. An electromagnetic clutch 29 is positioned between pulleys 23 and 25 and is controlled by trip fingers arranged in the document path ahead of the photographing station so that the film drive roll 15 is rotated and the film strip is advanced only when documents are being moved into the photographing station, as is well-known in the art. It is to be understood, of course, that the drive from motor 16 to rolls 12 and film drive roll 15 may be accomplished in other ways and the drive disclosed is only diagrammatic and for the purpose of illustration, since it forms no part of the present invention.

Figure 2:
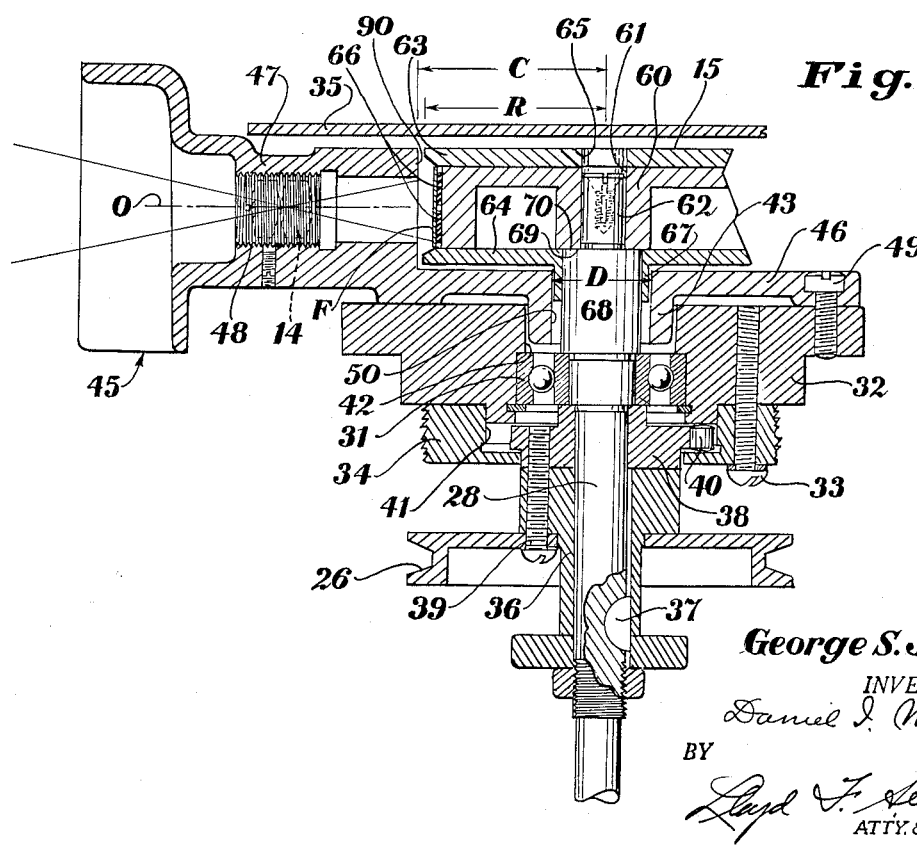
Fig. 2 is a vertical section through the film drive roll shaft and showing the relation of the various elements including the bracket, objective, and film drive roll.

With reference to Fig. 2, shaft 28 is journaled in bearing 31 mounted in plate 32 which is secured by screws 33 to bottom wall 34 of the compartment for the film drive mechanism which is enclosed by a hinged cover 35. A more complete disclosure of the supply and take-up reel compartments is to be found in copending application Serial No. 280,824 filed April 5, 1952, in the name of N. J. Rosenburgh and E. B. Schoonmaker and entitled Film Alarm System for Photographic Apparatus. Pulley 26 is fixed to shaft 28 by means of sleeve 36 and key 37. A one way clutch comprising a member 38 fixed to pulley 26 and sleeve 36 by screws 39 and a plurality of rollers 40 which are adapted to engage the wall of recess 41 formed in wall 34 permits shaft 28 to be rotated in only one direction, the direction for advancing the film strip from the supply reel to the take-up reel.

Plate 32 is provided with an aperture 42 for receiving a cylindrical boss 43 extending from objective mount 45 which comprises a mounting plate 46 and an objective support 47. It will be noted from Fig. 2 that objective mount 48 in which objective 14 is mounted is supported along optical axis 0 which is perpendicular to the axis of shaft 28. Objective mount 45 is secured to plate 32 by screws 49, see Fig. 7, and aperture 50 in boss 43 is concentric with the axis of shaft 28.

Film drive roll 15 comprises a cylindrical member 60 provided with a central aperture 61 which is received by the reduced portion 62 of shaft 28. Flanges 63 and 64 are secured to member 60 by screws not shown, flange 63 being provided with aperture 65 aligned with aperture 61. The periphery of member 60 is encircled by one or more bands 66 of a material, such as rubber, having a high coefficient of friction to provide an intimate driving contact with film strip F. Flange 64 is provided with a hub 67 having an outside diameter which permits it to be inserted in aperture 50 with only sufficient clearance to insure free rotation, the inside diameter being received by the enlarged portion 68 of shaft 28. Film drive roll 15 is located on shaft 28 by the engagement of face 69 of member 60 with shoulder 70 on shaft 28 and is retained thereon by the expansion of reduced portion 62. This is accomplished by the expansion of two or more axial and radial slots 71 in portion 62, see Figs. 7 and 8, by the conical headed screw 72 which, as it is moved axially, clamps film drive roll 15 and shaft 28 together.

In Fig. 3, the objective is of a shorter focal length so that objective mount 80 must be positioned closer to the axis of shaft 28 than objective mount 48. Consequently, film drive roll 81 must be of a smaller diameter than roll 15. However, boss 43 is provided with an aperture 82 which is larger than aperture 50 and hub 83 is larger in diameter than hub 67. In Fig. 4, the objective is of a longer focal length than objective 14 so that objective mount 85 is positioned farther from the axis of shaft 28 than objective mount 48 in Fig. 1. Film drive roll 86 must, therefore, be larger in diameter than roll 15. Aperture 87 in boss 43 is, however, smaller than aperture 50 and hub 88 is smaller in diameter than hub 67.

Each of the objective mounts 48, 80 and 85 contain objectives of different focal length which give a different reduction factor with respect to the image projected on the film strip. As the reduction factor increases, the image becomes smaller and the speed with which the film must be moved through the focal plane of the objective must be increased. Accordingly, as is well-known in the art, the diameter of the film drive roller must be decreased. In Figs. 2–4, it will be noted that the objective mounts are not of the same size, hence, different diameter threads are utilized for each mount. As a result, it is impossible for the operator to interchange the lens mounts with respect to the support 45. With respect to Figs. 2–4, it will also be noted that the rear surface 90 of objective support 47 in each instance is located at a distance C, $C_1$ and $C_2$ from the axis of shaft 28 and that these distances are only slightly larger than the overall radius R, $R_1$ and $R_2$ of film drive rolls 15, 81 and 86. Consequently, film drive rolls 15 and 86 could not be assembled on and operatively connected to shaft 28 in place of film drive roll 81. By the same token, film drive roll 86 could not be operatively connected to shaft 28 in place of film drive roll 15. Surface 90 of objective support 47 prevents any film drive roll placing the film strip F between the focal plane of the objective and the objective from being operatively connected to drive shaft 28.

In order to prevent any film drive roll placing the film strip F beyond the focal plane of the objective, the hubs of film drive rolls 15, 81 and 86 are of different diameters as well as the apertures 50, 82 and 87 in boss 43. To accomplish this result, the diameters D, $D_1$ and $D_2$ of the hubs decrease as the diameters of their respective film drive rolls increase. For this reason, the overall diameter of film drive roll 81 will clear shoulder 90 of support members 45 in Figs. 2 and 4 but hub 83 will not be received by apertures 50 and 87 so that it can be operatively connected to shaft 28. In the event the operator reverses the film drive roll in an attempt to mount it, the hubs are of such length as to prevent cover 35 from being fully closed.

In Fig. 5 another embodiment of the invention is disclosed for preventing the insertion of a film drive roll 92 on shaft 28 which places the film strip F beyond the focal plane of the objective. In this embodiment a pin 93 is carried by film drive roll 92 and rides freely in an annular recess 94 in plate 46. The pin 93 can be secured at a different radial dimension from the axis of each film drive roll with the annular recess in each plate located accordingly, or pin 93 can be of a different diameter in each film drive roll with each annular recess of corresponding width. In any arrangement, however, the pin will also serve to prevent closure of cover 35 if the film drive roll is inverted.

The embodiment disclosed in Fig. 6 shows a pin 97 which is fixed to the film drive roll and is located radially at different dimensions on each film drive roll. Aperture 98 in boss 43 is made a corresponding dimension to accept the pin of its proper film drive roll for free rotation therein. In this case also, the pin 97 prevents closure of cover 35 if the film drive roll is inverted and placed on shaft 28.

From the foregoing description, it is evident that an operator will not be able to assemble an objective, objective mount and film drive roll without having a "matched" assembly. In other words, since each objective mount will accept only one objective and only one film drive roll which will position the film strip in the focal plane of the objective, it is impossible to obtain any other combination of these elements. The embodiments disclosed in Figs. 2–6 may also be utilized for photographic copying apparatus of the duo-type, that is, apparatus utilizing two standard 16 mm. film strips and two lenses, or a single 35 mm. film strip and a single lens. In either case, the film drive roll will have to be sufficiently wide to accept 35 mm. film and the objective support will have to be provided with two apertures for receiving the objective mounts when 16 mm. film is used.

Since many other modifications of the disclosed embodiments of the invention will be suggested and apparent to those skilled in the art, the scope of the invention is pointed out in the appended claims.

Having now particularly described my invention, what I desire to secure by Letters Patent of the United States and what I claim is:

1. In photographic apparatus having an optical axis, the combination with an exposure station aligned with said optical axis, and a rotatable drive shaft having an axis perpendicular to said optical axis, of an objective having a focal plane for imaging an object in said exposure station, a film drive roll including an extending member having a predetermined relation with respect to the axis of said film drive roll and adapted to be operatively connected to said drive shaft for moving a film strip through the focal plane of said objective and said exposure station, and an objective mount for supporting said objective along said optical axis and in a position in which said focal plane coincides with the film strip on said film drive roll, said objective mount having a portion thereof arranged with respect to said drive shaft axis for permitting said film drive roll to be operatively connected to said drive shaft and for preventing operative connection to said drive shaft of a film drive roll which is adapted to position said film strip between said focal plane and said objective and provided with a hole concentric with the axis of said drive shaft for receiving the extending member of said film drive roll and permitting said film drive roll to be operatively connected to said drive shaft and for preventing operative connection to said drive shaft of a film drive roll which is adapted to position said film strip beyond said focal plane and has an extending member having a relation greater than said predetermined relation with respect to the axis of the film drive roll.

2. In photographic apparatus having an optical axis, the combination with an exposure station aligned with said optical axis, and a rotatable drive shaft having an axis perpendicular to said optical axis, of an objective having a focal plane for imaging an object in said exposure station, a film drive roll adapted to be operatively connected to said drive shaft and having a hub of predetermined diameter for moving a film strip through the focal plane of said objective and said exposure station, an objective mount adapted to be positioned with respect to said drive shaft for supporting said objective along said optical axis and in a position in which the focal plane of said objective coincides with the plane of the film strip comprising a mounting plate provided with an aperture adapted to encircle said drive shaft and to receive the hub of said film drive roll and an objective housing on said plate provided with an aperture for receiving said objective, said objective housing preventing operative connection to said drive shaft of a film drive roll which is adapted to position said film strip between said focal plane and said objective and said plate aperture preventing operative connection to said drive shaft of a film drive roll having a hub diameter greater than said predetermined diameter and which is adapted to position said film strip beyond said focal plane.

3. In photographic apparatus having an optical axis, the combination with an exposure station aligned with said optical axis, and a rotatable drive shaft having an axis perpendicular to said optical axis, of an objective having a focal plane for imaging an object in said exposure station, a film drive roll including an extending member having a predetermined relation with respect to the axis of said film drive roll and adapted to be operatively connected to said drive shaft for moving a film strip through the focal plane of said objective and said exposure station, an objective mount adapted to be positioned with respect to said drive shaft for supporting said objective along said optical axis and in a position in which the focal plane of said objective coincides with the plane of the film strip, and a mounting plate having an objective mount housing arranged thereon with a portion thereof positioned with respect to said drive shaft for preventing operative connection to said drive shaft of a film drive roll which is adapted to position said film strip between said focal plane and said objective and provided with a hole concentric with the axis of said drive shaft and cooperating with said extending member to permit said film drive roll to be operatively connected to said drive shaft and for preventing operative connection to said drive shaft of a film drive roll which is adapted to position said film strip beyond said focal plane and has an extending member having a relation greater than said predetermined relation with respect to the axis of the film drive roll.

4. In photographic apparatus having an optical axis, the combination with an exposure station aligned with said optical axis, and a rotatable drive shaft having an axis perpendicular to said optical axis, of an objective having a focal plane for imaging an object in said exposure station, a film drive roll adapted to be operatively connected to said drive shaft and having a hub of predetermined diameter for moving a film strip through the focal plane of said objective and said exposure station, an objective mount adapted to be positioned with respect to said drive shaft for supporting said objective along said optical axis and in a position in which the focal plane of said objective coincides with the film strip comprising a mounting plate provided with an aperture adapted to encircle said drive shaft and to receive the hub of said film drive roll and an objective housing on said plate having a surface perpendicular to said optical axis and at a distance from the axis of said drive shaft greater than the radius of said film drive roll to permit said film drive roll to be operatively connected to said drive shaft and provided with an aperture for receiving said objective, said surface preventing operative connection to said drive shaft of a film drive roll which is adapted to position said film strip between said objective and said focal plane and said plate aperture preventing operative connection to said drive shaft of a film drive roll having a hub diameter greater than said predetermined diameter and which is adapted to position said film strip beyond said focal plane.

5. In photographic apparatus having an optical axis, the combination with an exposure station aligned with said optical axis, and a rotatable drive shaft having an axis perpendicular to said optical axis, of an objective having a focal plane for imaging an object in said exposure station, a film drive roll adapted to be operatively connected to said drive shaft and having a depending member arranged on a predetermined radius for moving a film strip through the focal plane of said objective and said exposure station, an objective mount adapted to be positioned with respect to said drive shaft and comprising a mounting plate provided with an aperture adapted to encircle said drive shaft and to receive said depending member for permitting said film drive roll to be operatively connected to said drive shaft and an objective housing on said plate provided with an aperture for receiving said objective and for supporting said objective along said optical axis and in a position in which the focal plane of said objective coincides with the film strip and having a portion of said housing at a distance from the axis of said drive shaft greater than the radius of said film drive roll to permit said film drive roll to be operatively connected to said drive shaft, said portion preventing operative connection to said drive shaft of a film drive roll which is adapted to position said film strip between said objective and said focal plane and said plate aperture preventing operative connection to said drive shaft of a film drive roll having a depending member arranged on a radius greater than said predetermined radius and which is adapted to position said film strip beyond said focal plane.

6. In photographic apparatus having an optical axis, the combination with an exposure station aligned with said optical axis, and a rotatable drive shaft having an axis perpendicular to said optical axis, of an objective having a focal plane for imaging an object in said exposure station, a film drive roll adapted to be operatively connected to said drive shaft and having a depending member arranged on a predetermined radius for moving a film strip through the focal plane of said objective and said exposure station, an objective mount adapted to be positioned with respect to said drive shaft and comprising a mounting plate provided with an aperture adapted to encircle said drive shaft and an annular recess concentric with the axis of said drive shaft and adapted to receive said depending member for permitting said film drive roll to be operatively connected to said drive shaft and an objective housing on said plate provided with an aperture for receiving said objective and supporting said objective along said optical axis and in a position in which the focal plane of said objective coincides with the film strip and having a portion of said housing at a distance greater than the radius of said film drive roll to permit said film drive roll to be operatively connected to said drive shaft, said portion preventing operative connection to said drive shaft of a film drive roll which is adapted to position said film strip between said objective and said focal plane and said annular recess preventing operative connection to said drive shaft of a film drive roll having a depending member arranged on a radius greater than said predetermined radius and which is adapted to position said film strip beyond said focal plane.

References Cited in the file of this patent

UNITED STATES PATENTS 2,538,269    Pratt ------------------ Jan. 16, 1951